(12) United States Patent
Combs

(10) Patent No.: US 6,511,124 B2
(45) Date of Patent: Jan. 28, 2003

(54) TRAY TABLE FOR A CHILD'S CAR SEAT AND ASSOCIATED METHODS

(76) Inventor: Mark Ellis Combs, 4521 Lenmore St., Orlando, FL (US) 32812

( * ) Notice: Subject to any disclaimer, the term of this patent is extended or adjusted under 35 U.S.C. 154(b) by 47 days.

(21) Appl. No.: 09/768,113

(22) Filed: Jan. 23, 2001

(65) Prior Publication Data
US 2002/0096914 A1 Jul. 25, 2002

(51) Int. Cl.[7] .............................. A47B 83/02; A47D 1/10
(52) U.S. Cl. .................... 297/135; 297/148; 297/153; 297/188.14; 297/188.2; 297/256.15; 297/250.1
(58) Field of Search ................... 297/148, 153, 297/135, 188.14, 188.2, 256.15, 250.1

(56) References Cited

U.S. PATENT DOCUMENTS

| | | | |
|---|---|---|---|
| 4,795,209 A | * | 1/1989 | Quinlan, Jr. et al. ........ 297/153 |
| 5,106,156 A | | 4/1992 | Marquis |
| 5,332,286 A | | 7/1994 | Atherton et al. |
| 5,468,043 A | * | 11/1995 | Chein ......................... 297/153 |
| 5,533,786 A | | 7/1996 | Cone, II |
| 5,615,925 A | | 4/1997 | Kain |
| D392,513 S | | 3/1998 | Reber |
| 5,810,432 A | | 9/1998 | Haut et al. |
| 5,975,628 A | * | 11/1999 | Russell ................... 297/148 X |
| 6,106,057 A | * | 8/2000 | Lee .................... 297/256.15 X |
| 6,179,377 B1 | * | 1/2001 | Harper ........................ 297/148 |

* cited by examiner

Primary Examiner—Rodney B. White
(74) Attorney, Agent, or Firm—Allen, Dyer, Doppelt, Milbrath & Gilchrist, P.A.

(57) ABSTRACT

A tray table for a child's car seat having at least two seat belt receiving slots, comprises a table top having an upper surface, a lower surface, and a periphery, and two connecting members extending from the lower surface of the table top for inserting in the seat belt receiving slots to thereby connect the table top to the child's car seat. The connecting members extend from the lower surface at an angle sufficient so that the upper surface of the table top is positioned approximately parallel to a seating surface of the car seat when the connecting members are properly inserted in the seat belt receiving slots. The table top includes an opening serving as a cup holder, or having a container for holding toys, crayons, and other small articles.

46 Claims, 5 Drawing Sheets

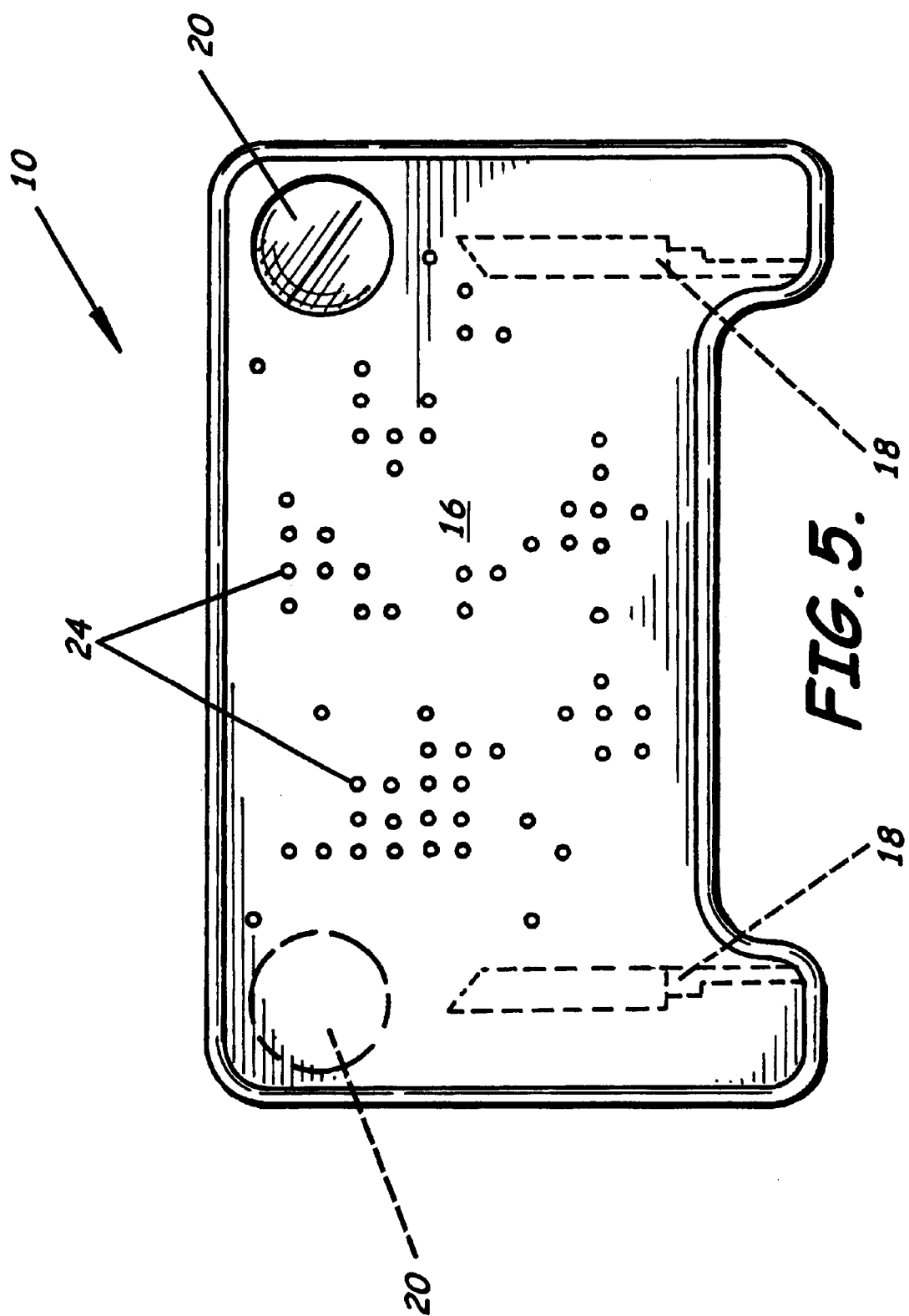

TRAY TABLE FOR A CHILD'S CAR SEAT AND ASSOCIATED METHODS

FIELD OF THE INVENTION

The present invention relates to the field of car seats for children and, more particularly, to a tray table for a child's car seat.

BACKGROUND OF THE INVENTION

Car seats for children have been popular for many years, since the standard vehicle seats provided by car manufacturers are not well adapted to small children. In many states, children's car seats have become mandatory under the law for children of about 5 years of age and younger.

Parents who travel with their children by any one of various types of the vast majority of road vehicles, are usually very familiar with children's car seats. These car seats generally include seat belt receiving slots to thereby secure the child's car seat to the vehicle's standard seat by means of the seat belt. As any parent well knows who travels in a vehicle with children, keeping the child entertained while restrained in a car seat is often a challenging, if not insurmountable task.

SUMMARY OF THE INVENTION

With the foregoing in mind, the present invention advantageously provides a tray table for a child's car seat. The tray table easily connects to a standard car seat and provides a place for the child to play with small toys, to draw or color in a coloring book, to play a board game, write, or keep entertained in myriad ways.

The present invention discloses a tray table for a child's car seat having at least two seat belt receiving slots. The tray table comprises a table top having an upper surface, a lower surface, and a periphery, and two connecting members extending from the lower surface of the table top for inserting in the seat belt receiving slots to thereby connect the table top to the child's car seat. The connecting members extend from the lower surface at an angle sufficient so that the upper surface of the table top is positioned approximately parallel to a seating surface of the car seat when the connecting members are properly inserted in the seat belt receiving slots. The table top is preferably disposed with an opening therein to serve as a cup holder for a child using the tray table.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
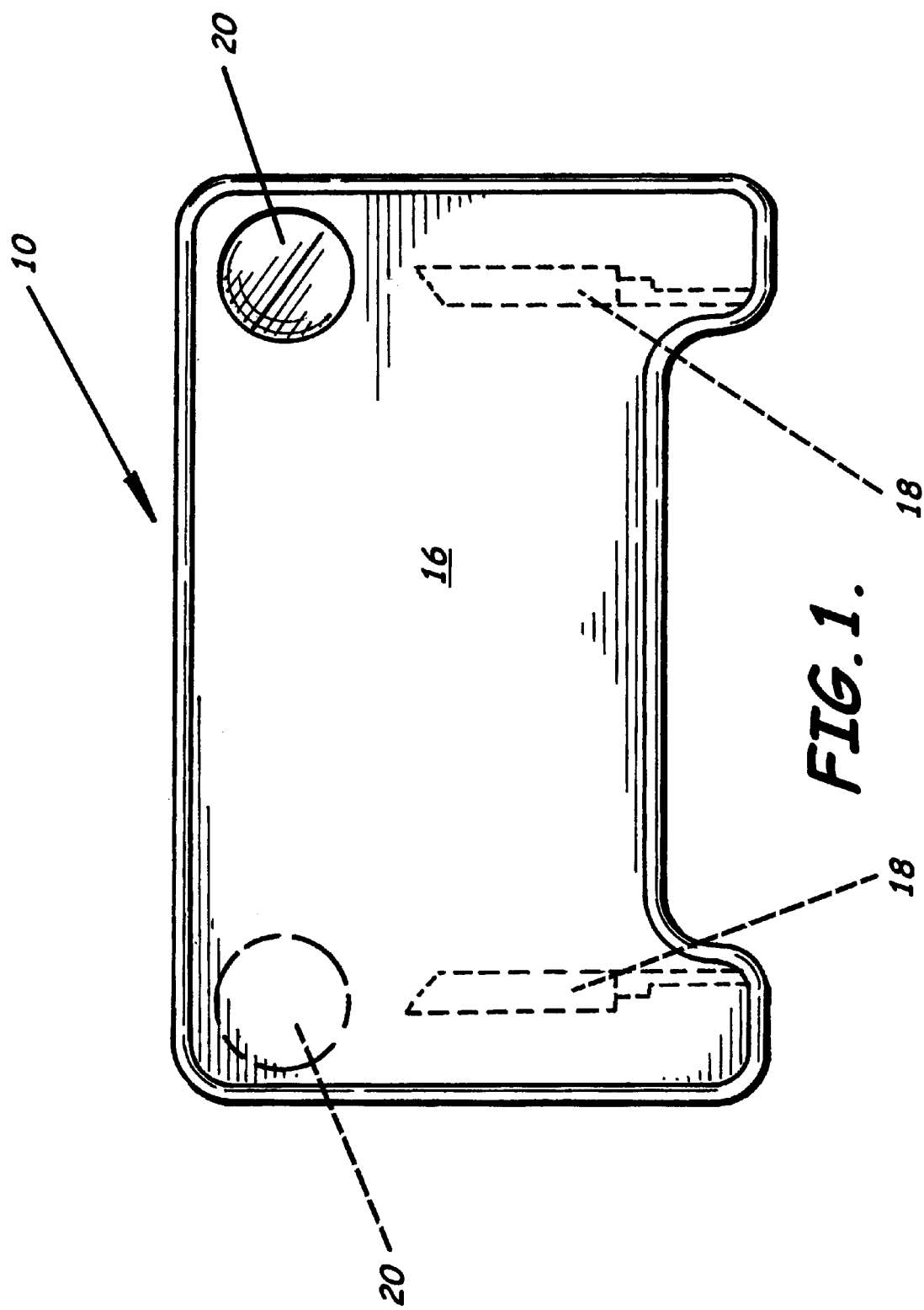
FIG. 1 is a top plan view of the tray table according to an embodiment of the present invention.
Figure 2:
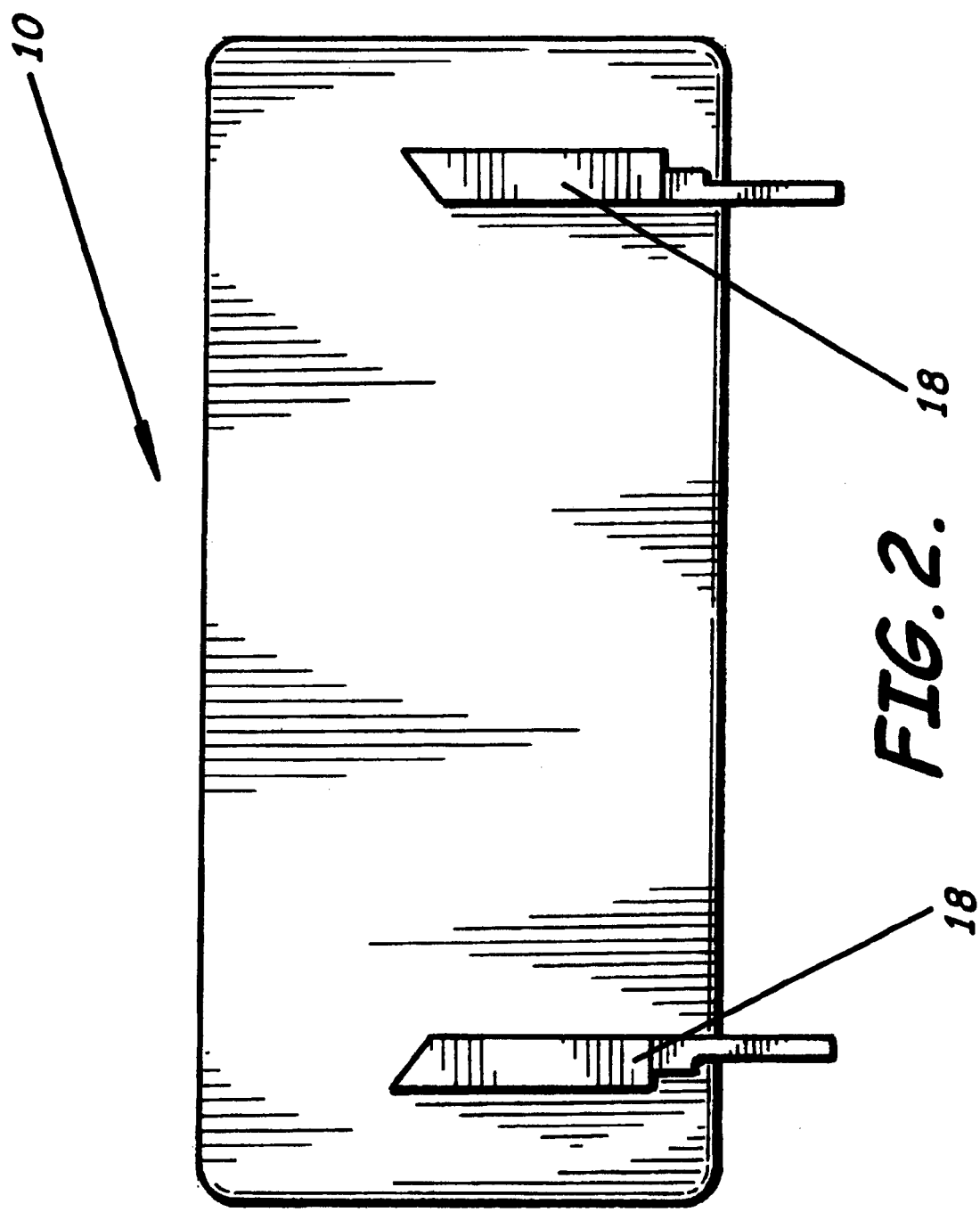
FIG. 2 is a bottom plan view of an alternate embodiment of the tray table of FIG. 1.
Figure 3:
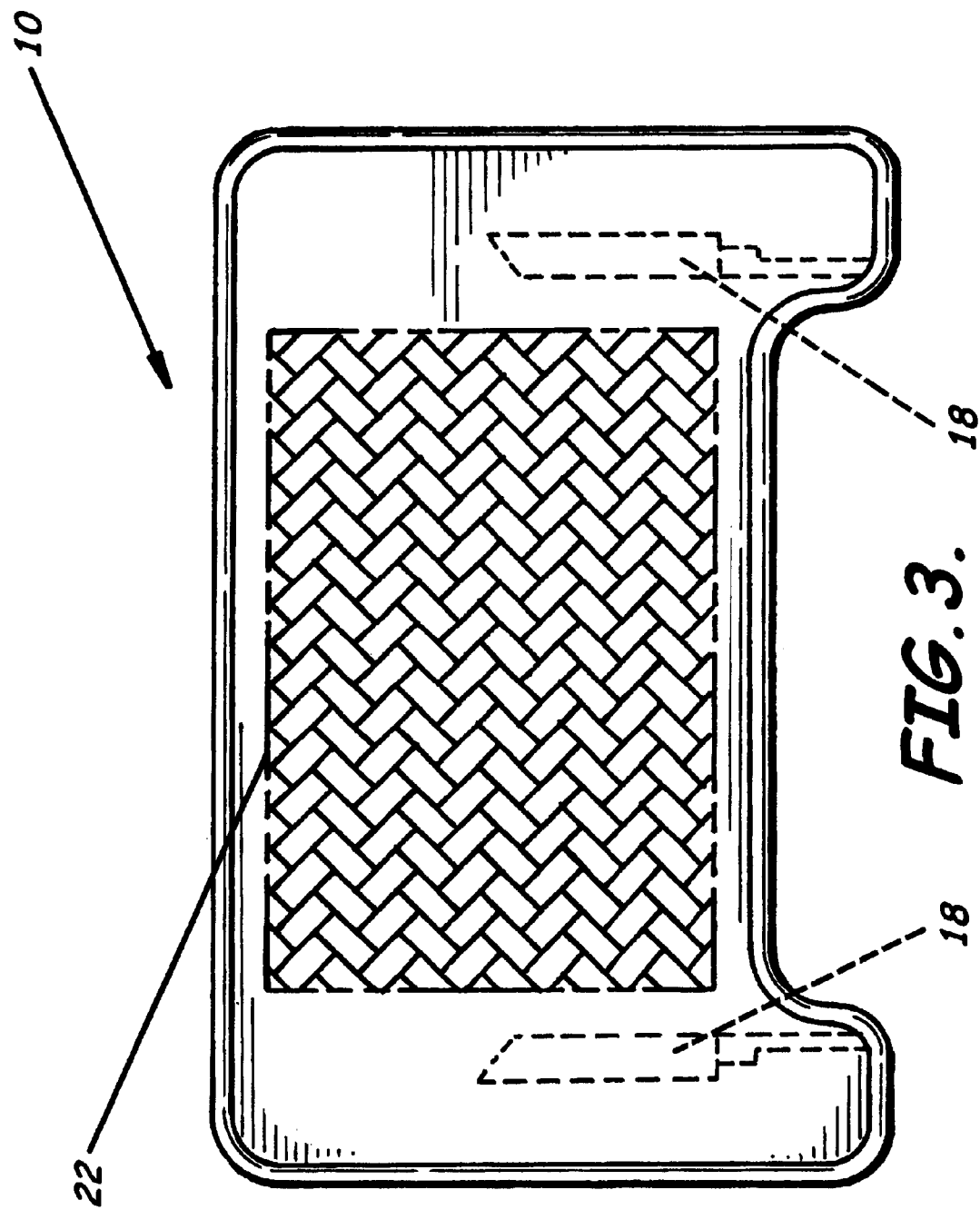
FIG. 3 is a top plan view of the tray table of FIG. 1 having thereon a child's game board.
Figure 4:
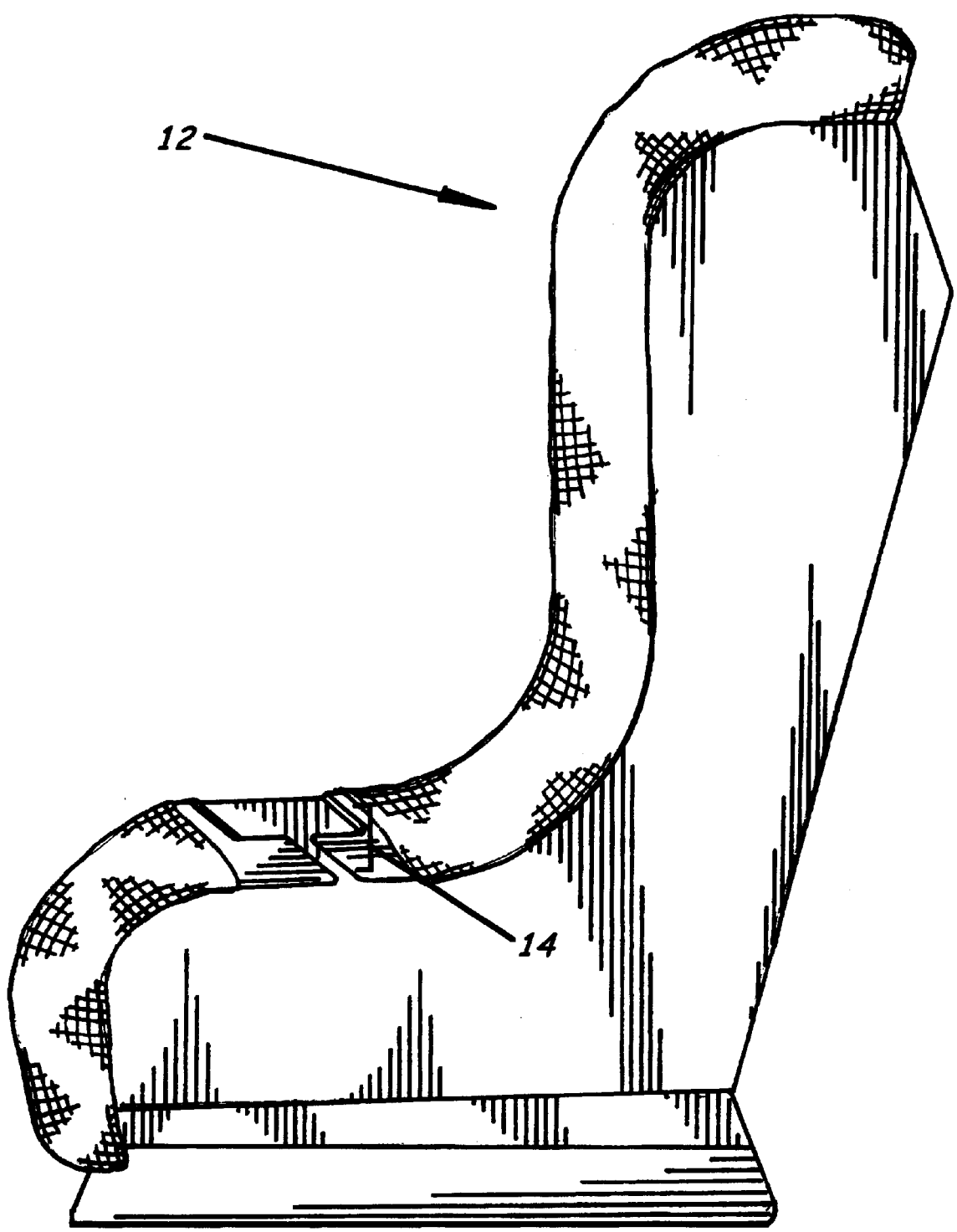
FIG. 4 is a side elevation of a typical car seat for children.

FIGS. 1 through 3 illustrate a tray table 10 for a child's car seat. FIG. 4 shows a side elevation of a typical car seat 12. These car seats 12 for children are generally provided with at least two seat belt receiving slots 14, as shown in FIG. 4. Most car seats 12 have these seat belt receiving slots 14 positioned along raised sides of the car seat. When used for a very young child, an infant, the car seat 12 is normally placed so that the child faces the backrest of the vehicle's seat, that is, the child faces rearwardly in the vehicle. In this first position, the vehicle's seat belt is passed through the seat belt receiving slots 14 in order to secure the child's car seat to the vehicle's seat. For older children, however, the car seat 12 is positioned on the vehicle's seat so that the child faces toward the front of the vehicle, that is, the backrest of the child's car seat rests on the backrest of the vehicle's seat. In this second position, the seat belt receiving slots 14 are not used for a seat belt, and the car seat is secured on the vehicle's seat using an alternative arrangement. The tray table 10 of the present invention is preferably intended for use by children who are old enough to handle toys and other items such as a drinking cup, a child beyond the infant stage. Therefore, a preferred embodiment of the tray table 10 is designed to be connected to a seat belt receiving slot 14 which is not in use with a seat belt. In another embodiment, however, the tray table 10 may be connected to the seat belt receiving slot 14 which also has a seat belt connected therein. In this embodiment, the tray table 10 of the invention provides a place where the infant's caretaker may conveniently rest items such as a baby bottle, for example.

The tray table 10 comprises a table top 16 having an upper surface, a lower surface, and a periphery. Two connecting members 18 extend from the lower surface of the table top 16 for insertion in the seat belt receiving slots 14 to thereby connect the table top to the child's car seat 12. It should be noted that in another embodiment the connecting members 18 are of a thickness sufficient for inserting in a seat belt receiving slot 14 while a seat belt is also inserted therein. The connecting members 18 extend from the lower surface of the table top 16 at an angle sufficient so that the upper surface of the table top is positioned approximately parallel to a seating surface of the car seat 12 when the connecting members are properly inserted in the seat belt receiving slots 14. However, it is preferred that the relative angle between the upper surface of the table top 16 and the seating surface of the car seat 12 be adjustable, and the distance between a periphery of the table top 16 and the back rest surface of the car seat 12 also be adjustable as known to those skilled in the art.

Additionally, as shown in FIG. 1, the tray table 10 may also comprise an opening 20 extending through the table top 16 from the upper surface to the lower surface, the opening dimensioned to hold a container partially therein without the container falling through the opening. The opening in the table top 16, therefore, functions as a cup holder for a child seated in the car seat 12. In a further embodiment, the tray table 10 comprises a container positioned in the opening and dimensioned so as to engage a periphery of the opening and not fall therethrough. The container may comprise a bag, which may be a mesh bag, for example, to hold toys, crayons, or other small items. The opening 20 in the table top 16 may advantageously be disposed around its periphery with a material providing friction against a container positioned in the opening to thereby aid in retaining the container therein, for example, a ring of synthetic material such as rubber or plastic.

It should be understood that the tray table 10 of the present invention may comprise an ornamental design. The ornamental design may be applied to a surface of the tray table 10, or may include the tray table itself incorporating an ornamental shape. For example, the table top 16 could include the likeness of a cartoon character, or of a character from children's stories. For example, a number of well-known, proprietary characters suitable for illustrating the tray table include Mickey Mouse®, and other characters owned by the Walt Disney Co. In addition, there are many other well-known characters from children's stories and suitable for use with the present invention, for example, the currently popular Harry Potter®. Further, to keep a child seated in the car seat 12 entertained, the upper surface of the table top 16 could comprise a board game 22, as shown in FIG. 3. The table top 16 may also have thereon a plurality of small openings 24, so that the table top resembles a peg board for engaging a plurality of pegs. Such a peg board configuration would allow the child to connect to the tray table 10 several well known building block toys which incorporate pegs for making connections. Further variations of the tray table 10 include an upper surface of the table top 16 comprising a drawing surface for the child to use. Preferably, the upper surface of the table top 16 comprises a curb along the periphery to thereby substantially contain a spill, as illustrated in FIG. 1. The tray table 10 may also be constructed so that the table top 16 comprises metal which attracts a magnet, advantageously allowing a child to play with magnetized game pieces which will stick to the table top. Another preferred embodiment of the present tray table 10 includes constructing the tray table, particularly the table top 16, comprising a phosphorescent material which glows in the dark, to thereby make the table top more visible when in use at night.

Advantageously, in yet another preferred embodiment of the invention, the tray table 10 comprises a table top 16 detachably connected to the two connecting members 18. A particularly useful way to detachably connect the table top 16 the connecting members 18 is by use of a hook and loop fastener such as Velcro®. In such a configuration, the table top 16 detaches from the two connecting members upon the application of a sufficient force, making the table top break away from the car seat 12.

A method aspect of the invention includes providing a tray table adjacent a child's car seat having at least two seat belt receiving slots. The method comprises inserting at least two connecting members in the at least two seat belt receiving slots, and connecting a table top having an upper surface, a lower surface, and a periphery to the at least two connecting members. The method additionally includes positioning an opening in the table top, the opening extending through the table top from the upper surface to the lower surface, and inserting a container in the opening, the container dimensioned so as to engage a periphery of the opening and not fall therethrough.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A tray table in combination with a child's car seat, the combination comprising:
   a child's car seat having a seat area and at least one seat belt receiving slot adjacent the seat area, the seat belt slot having an opening along a periphery of the slot to therethrough receive a seat belt; and
   a tray table including a table top having an upper surface, a lower surface, a periphery, and at least one connecting member adapted for inserting in the seat belt receiving slot to thereby connect the tray table to the child's car seat.

2. The tray table of claim 1, wherein said connecting members extend from the lower surface at an angle sufficient so that the upper surface of said table top is positioned approximately parallel to a seating surface of the car seat when the connecting members are properly inserted in the seat belt receiving slots.

3. The tray table of claim 1, wherein a relative angle between the upper surface of the table top and a seating surface of the car seat is adjustable.

4. The tray table of claim 1, wherein distance between a periphery of the table top and a back rest surface of the car seat is adjustable.

5. The tray table of claim 1, further comprising an ornamental design.

6. The tray table of claim 1, wherein the table top comprises the likeness of a cartoon character.

7. The tray table of claim 1, wherein the table top comprises the likeness of a character from children's literature.

8. The tray table of claim 1, wherein the upper surface of the table top comprises a board game.

9. The tray table of claim 1, wherein the table top comprises a plurality of small openings for engaging a plurality of pegs.

10. The tray table of claim 1, wherein the upper surface of the table top comprises a drawing surface.

11. The tray table of claim 1, wherein the upper surface of the table top comprises a curb along the periphery to thereby substantially contain a spill.

12. The tray table of claim 1, wherein the table top comprises metal which attracts a magnet.

13. The tray table of claim 1, further comprising a phosphorescent material which glows in the dark.

14. The tray table of claim 1, wherein said table top is detachably connected to said two connecting members.

15. The tray table of claim 1, wherein said table top is detachably connected to said two connecting members by hook and loop fasteners.

16. The tray table of claim 1, wherein said table top detaches from said two connecting members upon application of a sufficient force.

17. The tray table of claim 1, further comprising an opening in the table top and a container positioned in the opening and dimensioned so as to engage a periphery of the opening and not fall therethrough.

18. The tray table of claim 1, further comprising a bag having an interior cavity, the bag connected to said table top so that the opening connects with the interior cavity.

19. The tray table of claim 18, wherein said bag comprises a mesh.

20. The tray table of claim 1, further comprising an opening extending through the table top from the upper surface to the lower surface, said opening dimensioned to hold a container partially therein without the container falling through the opening.

21. The tray table of claim 20, wherein said table top comprises around a periphery of the opening a material providing friction against a container positioned in the opening to thereby aid in retaining the container therein.

22. The tray table of claim 21, wherein the material providing friction comprises a ring of synthetic material.

23. In combination, a child's car seat and tray table, the combination comprising:
   a child's car seat having at least two seat belt receiving slots for securing the car seat to a vehicle's seat with a seat belt; and
   a tray table comprising a table top having an upper surface, a lower surface, and a periphery, and at least two connecting members extending from the lower surface of the table top and inserted in the at least two seat belt receiving slots, the seat belt receiving slots adapted to receive the at least two connecting members, thereby connecting the tray table to the child's car seat.

24. The combination of claim 23, wherein the at least two connecting members extend from the lower surface of the table top at an angle sufficient so that the upper surface of the table top is positioned approximately parallel to a seating surface of the car seat when the at least two connecting members are properly inserted in the at least two seat belt receiving slots.

25. The combination of claim 23, wherein a relative angle between the upper surface of the table top and a seating surface of the car seat is adjustable.

26. The combination of claim 23, wherein distance between a periphery of the table top and a back rest surface of the car seat is adjustable.

27. The combination of claim 23, wherein the table top comprises an ornamental design.

28. The combination of claim 23, wherein the table top comprises the likeness of at least one cartoon character.

29. The combination of claim 23, wherein the table top comprises the likeness of at least one character from children's literature.

30. The combination of claim 23, wherein the upper surface of the table top comprises a board game.

31. The combination of claim 23, wherein the table top comprises a plurality of small openings for engaging a plurality of pegs.

32. The combination of claim 23, wherein the upper surface of the table top comprises a drawing surface.

33. The combination of claim 23, wherein the upper surface of the table top comprises a curb along the periphery to thereby substantially contain a spill.

34. The combination of claim 23, wherein the tray table further comprises a phosphorescent material which glows in the dark.

35. The combination of claim 23, wherein the table top is detachably connected to the at least two connecting members.

36. The combination of claim 23, wherein the table top detaches from the at least two connecting members upon application of a sufficient force.

37. The combination of claim 23, wherein the table top comprises an opening dimensioned to hold a drinking cup.

38. The combination of claim 37, wherein the opening extends from the upper surface of the table top and therethrough, and is dimensioned to hold a container partially therein without the container falling through the opening.

39. The combination of claim 37, further comprising a container positioned in the opening and dimensioned so as to engage a periphery of the opening and not fall therethrough.

40. The combination of claim 37, further comprising a bag having an interior cavity, the bag connected to the table top so that the opening connects with the interior cavity.

41. The combination of claim 40, wherein said bag comprises a mesh.

42. The combination of claim 37, wherein the table top comprises around a periphery of the opening a material providing friction against a container positioned in the opening to thereby aid in retaining the container therein.

43. The combination of claim 42, wherein the material providing friction comprises a ring of synthetic material.

44. A method of providing a tray table adjacent a child's car seat having at least two seat belt receiving slots, the method comprising:
   inserting at least two connecting members in the at least two seat belt receiving slots, the seat belt receiving slots adapted to receive the at least two connecting members; and
   connecting a table top having an upper surface, a lower surface, and a periphery to the at least two connecting members.

45. The method of claim 44, further comprising positioning an opening in the table top, the opening extending through the table top from the upper surface to the lower surface.

46. The method of claim 44, further comprising inserting a container in the opening, the container dimensioned so as to engage a periphery of the opening and not fall therethrough.

* * * * *